US012226968B2

(12) United States Patent
Shan et al.

(10) Patent No.: US 12,226,968 B2
(45) Date of Patent: Feb. 18, 2025

(54) INJECTION OVERMOLDING WITH HEAT/COOL CYCLING FOR MAKING OPTICAL LENSES USING 3D-PRINTED FUNCTIONAL WAFERS

(71) Applicant: Essilor International, Charenton-le-Pont (FR)

(72) Inventors: Haifeng Shan, Shrewsbury, MA (US); Aref Jallouli, Shrewsbury, MA (US); Hao-Wen Chiu, Holden, MA (US)

(73) Assignee: Essilor International, Charenton-le-Pont (FR)

( * ) Notice: Subject to any disclaimer, the term of this patent is extended or adjusted under 35 U.S.C. 154(b) by 91 days.

(21) Appl. No.: 17/623,692

(22) PCT Filed: Jul. 1, 2020

(86) PCT No.: PCT/EP2020/068458
§ 371 (c)(1),
(2) Date: Dec. 29, 2021

(87) PCT Pub. No.: WO2021/001399
PCT Pub. Date: Jan. 7, 2021

(65) Prior Publication Data
US 2022/0266488 A1 Aug. 25, 2022

(30) Foreign Application Priority Data

Jul. 2, 2019 (EP) .................................... 19315053

(51) Int. Cl.
*B29D 11/00* (2006.01)
*B29C 45/14* (2006.01)
(Continued)

(52) U.S. Cl.
CPC ...... *B29D 11/0073* (2013.01); *B29C 45/1418* (2013.01); *B29C 45/14778* (2013.01);
(Continued)

(58) Field of Classification Search
CPC .......... B29C 45/14778; B29C 45/1418; B29D 11/0073; B33Y 80/00
See application file for complete search history.

(56) References Cited

U.S. PATENT DOCUMENTS 6,220,703 B1 4/2001 Evans et al.
2004/0125335 A1 7/2004 Vu
(Continued)

FOREIGN PATENT DOCUMENTS

CN 104054017 9/2014
EP 0226020 6/1987
(Continued)

OTHER PUBLICATIONS

Askadskii et al, "Prediction of the Compatibility of Polymers and Analysis of the Microphase Compositions and Some Properties of Blends", Polymer Science, vol. 52, No. 2, (2015), pp. 186-199.
(Continued)

*Primary Examiner* — Mathieu D Vargot
(74) *Attorney, Agent, or Firm* — Norton Rose Fulbright US LLP

(57) ABSTRACT

Disclosed herein is an injection molding method for making optical thermoplastic lenses using 3D—printed functional wafers. The method employs a variable injection molding cavity temperature that is heated to at least wafer Tg—10° C.

8 Claims, 4 Drawing Sheets

(51) Int. Cl.
*B29L 11/00* (2006.01)
*B33Y 80/00* (2015.01)

(52) U.S. Cl.
CPC .......... *B29K 2995/0031* (2013.01); *B29K 2995/0073* (2013.01); *B29L 2011/0016* (2013.01); *B33Y 80/00* (2014.12)

(56) References Cited

U.S. PATENT DOCUMENTS

| | | |
|---|---|---|
| 2007/0138664 A1 | 6/2007 | Chen et al. |
| 2007/0202265 A1* | 8/2007 | Berzon ............ B29D 11/0073 427/407.1 |
| 2008/0246187 A1 | 10/2008 | Chiu et al. |
| 2009/0273756 A1 | 11/2009 | Vu |
| 2013/0329184 A1 | 12/2013 | Barzak et al. |
| 2017/0322344 A1 | 1/2017 | Yoshida et al. |
| 2019/0243161 A1 | 8/2019 | Gloge et al. |

FOREIGN PATENT DOCUMENTS

| | | |
|---|---|---|
| EP | 3222420 | 9/2017 |
| EP | 3312662 | 4/2018 |
| EP | 3437845 | 6/2019 |
| EP | 3579044 | 12/2019 |
| KR | 20200130861 | * 11/2020 |
| WO | WO2018/224395 | 12/2018 |
| WO | WO2021/001398 | 1/2021 |
| WO | WO2021/001403 | 1/2021 |

OTHER PUBLICATIONS

ASTM D790-03—"Standard Test Methods for Flexural Properties of Unreinforced and Reinforced Plastics and Electrical Insulating Materials", (2003), pp. 1-11.

ASTM E1356-08—"Standard Test Method for Assignment of the Glass Transition Temperatures by Differential Scanning Calorimetry", (2014), pp. 1-4.

Backfolk et al, "Determination of the glass transition temperature of latex films: Comparison of various methods", Polymer Testing, Elsevier, Amsterdam, NL, vol. 26, No. 8, Nov. 14, 2007 (Nov. 14, 2007), p. 1031-1040.

International Search Report & Written Opinion issued in priority application PCT/EP2020/068458, dated Sep. 1, 2020.

International Search Report & Written Opinion issued in related application PCT/EP2020/068463, dated Oct. 7, 2020.

International Search Report & Written Opinion issued in related application PCT/EP2020/068457, dated Sep. 23, 2020.

Office Action issued in corresponding Chinese Application No. 202080048194.6, dated Dec. 29, 2023.

* cited by examiner

INJECTION OVERMOLDING WITH HEAT/COOL CYCLING FOR MAKING OPTICAL LENSES USING 3D-PRINTED FUNCTIONAL WAFERS

CROSS-REFERENCE TO RELATED APPLICATIONS

This application is a national phase application under 35 U.S.C. § 371 of International Application No. PCT/EP2020/068458 filed 1 Jul. 2020, which claims priority to European Patent Application No. 19315053.9 filed 2 Jul. 2019. The entire contents of each of the above-referenced disclosures is specifically incorporated by reference herein without disclaimer.

FIELD OF THE INVENTION

The present invention generally relates to the fields of ophthalmic lenses and additive manufacturing.

BACKGROUND

Wafer technology is a major asset for producing thermoplastic lenses with various optical functionalities, such as selective light transmittance, reflectance or absorbance, polarization properties, color, and photochromism. The use of wafers allow lenses to be provided with these various functionalities without making changes to the bulk lens resin. In practice, however, small-volume experiments on new and untried investigational wafers is hindered by wafer manufacturing processes that are typically set up for high production volumes.

Additive manufacturing is a cost effective method for producing small quantities of prototyping parts. FDM Fused Deposition Modeling (sometimes referred to as Fused Filament Fabrication or FFF) is the most widely used additive manufacturing technology for producing thermoplastic parts. FDM can be used to produce a small number of wafers having specific dyes and/or filters for experiments and testing. FDM therefore offers a unique method for producing short-run parts without having to interrupt large-volume manufacturing processes.

One major disadvantage of FDM 3D-printing is its inability to manufacture parts of optical quality. FDM involves the repeated application or build-up of multiple voxels of polymer filament material. The net result is a manufactured part with a rough surface and non-transparent appearance that scatters transmitted light significantly.

Another disadvantage associated with 3D-printed wafers is that the wafer's convex surface is not supplied with enough heat during constant-temperature injection over-molding processes. This results in the wafer maintaining its rough, light-scattering convex surface. In order for FDM to become useful for wafer manufacturing, some aspects of the lens manufacturing process chain must be improved upon.

SUMMARY

The inventors have developed a lens manufacturing technique that addresses the optical quality issues associated with injection over-molding of FDM 3D-printed functional wafers. The solution lies in raising the injection molding cavity temperature to a temperature that is at least 10° C. below the thermoplastic wafer's glass transition temperature.

The present disclosure provides a method for producing an optical article by over-molding an additive manufactured functional wafer onto a convex surface of a base lens to produce an ophthalmic lens. In some aspects, the method is as defined in the claims. In some embodiments, the additive manufactured functional wafer is wafer of non-optical quality with a surface roughness greater than 50 nm RMS. In some aspects, the over-molding process includes the steps of affixing the functional wafer to the concave surface of an injection molding cavity, filling the injection molding cavity with molten base lens material, and raising the injection molding cavity ($T_{cavity}$) temperature from a first temperature to a second temperature that is at least 10° C. below the functional wafer glass transition temperature ($T_{g, wafer}$) (Formula I).

$$T_{cavity} \geq T_{g,wafer} - 10° \text{ C.} \quad (I)$$

In some embodiments, the first temperature ranges from room temperature to 10° C. below the functional wafer glass transition temperature. In some aspects, the method further comprises raising the injection molding cavity temperature to a temperature that is at least 5° C. above the functional wafer glass transition temperature (Formula II).

$$T_{cavity} \geq T_{g,wafer} + 5° \text{ C.} \quad (II)$$

In some aspects, the over-molding process viscoelastically deforms the functional wafer. In some embodiments, viscoelastic deformation templates the concave surface texture of the mold cavity onto the convex surface of the functional wafer to provide an ophthalmic lens with an optically smooth convex surface. In some aspects, the templating produces an ophthalmic lens with an optically smooth convex surface having a roughness less than 20 nm RMS. In some aspects, at least some of the viscoelastic deformation involves a reduction of the functional wafer's surface roughness. The over-molding process can employ a 3D-printed wafer of non-optical quality, in part because heat and pressure provided by the injection molding apparatus and the molten lens material viscoelastically deform the 3D-printed wafer's non-optical quality, rough surface into a smooth surface of optical quality. In some embodiments, the functional wafer includes at least one UV cut, blue cut, color enhancement, near infra-red cut, chronocut, and/or photochromicity dye or filter.

In some embodiments, the functional wafer material is selected from the group consisting of polyamides, polyesters, polyester alloys, polyethylenes, polysiloxanes, polyimides, polyurethanes, polypropylenes, polyethylene terephtalate, polyetheretherketones, polyetherarylketones, perfluoroalkoxys, polychloro-trifluoroethylenes, polyolefins such as cyclo-olefin polymers, polyacrylics, polyacrylates such as polymethylmethacrylate (PMMA), poly(meth)acrylate, polyethyl(meth)acrylate, polybutyl(meth)acrylate, and polyisobutyl(meth)acrylate, polythiourethanes, polycarbonates (PC), ali-cyclic polycarbonates, polyallylics, polyphenylene sulfides, polyvinyls, polyarylenes, polyoxides, polysulfones, fluorinated ethylene propylenes, polytetrafluoroethylenes, ethylene-tetrafluoroethylenes, polyvinylidene fluorides, ethylene-chlorortifluoroethylenes, polystyrenes, polyacrylonitriles, styrene copolymers such as styrene acrylonitrile, styrene methyl methacrylate, styrene butadiene methyl methacrylate, acrylonitrile butadiene styrene, methyl methacrylate acrylonitrile butadiene styrene, and styrene maleic anhydride, polyimides, polyetherimides, polypentenes, cellulose triacetate, copolymers thereof, and combinations thereof. Suitable polyamides include aliphatic nylon polyamides, such as nylon 6, nylon 6-6, nylon 6-10, nylon 6-12, nylon 10, nylon 10-10, nylon 11, nylon 12, a copolymer thereof, or a derivative or mixture thereof.

Some aspects of the disclosure are directed to an optical article comprising an ophthalmic lens, wherein the ophthalmic lens comprises a base lens and an additive-manufactured functional wafer affixed to the convex surface of the base lens. In some aspects, the optical article is as defined in the claims. In some embodiments, the ophthalmic lens is produced by injection over-molding molten base lens material over the additive-manufactured functional wafer and heating the injection molding cavity to a molding temperature at least 10° C. below, preferably at least 5° C. above, the functional wafer glass transition temperature. In some embodiments, the ophthalmic lens has an optically smooth convex surface. In some embodiments, the functional wafer includes at least one UV cut, blue cut, color enhancement, near infra-red cut, chronocut, and/or photochromicity dye or filter.

In some embodiments, the functional wafer material and the base lens material are selected to be compatible with eath other. Thermoplastic materials that inter-diffuse into one another in the molten state are said to exhibit compatibility, or to be compatible with each other. Examples of such wafer/lens pairs include but are not limited to PMMA/PC, Copolyester/PC, polyester alloy/PC, and ali-cyclic polycarbonate/PC.

"Ophthalmic lens," according to the disclosure, is defined as a lens adapted, namely for mounting in eyeglasses, whose function is to protect the eye and/or to correct vision. This lens can be an afocal, unifocal, bifocal, trifocal, or progressive lens. The ophthalmic lens may be corrective or un-corrective. Eyeglasses wherein ophthalmic lenses will be mounted could be either a traditional frame comprising two distinctive ophthalmic lenses, one for the right eye and one for the left eye, or like mask, visor, helmet sight or goggle, wherein one ophthalmic lens faces simultaneously the right and the left eyes. Ophthalmic lenses may be produced with traditional geometry as a circle or may be produced to be fitted to an intended frame.

Any embodiment of any of the disclosed compositions and/or methods can consist of or consist essentially of—rather than comprise/include/contain/have—any of the described elements and/or features and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

The term "substantially" and its variations are defined as being largely but not necessarily wholly what is specified as understood by one of ordinary skill in the art, and in one non-limiting embodiment substantially refers to ranges within 10%, within 5%, within 1%, or within 0.5%. The term "about" or "approximately" or "substantially unchanged" are defined as being close to as understood by one of ordinary skill in the art, and in one non-limiting embodiment the terms are defined to be within 10%, preferably within 5%, more preferably within 1%, and most preferably within 0.5%.

The use of the word "a" or "an" when used in conjunction with the term "comprising" in the claims and/or the specification may mean "one," but it is also consistent with the meaning of "one or more," "at least one," and "one or more than one."

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The compositions and methods for their use can "comprise," "consist essentially of," or "consist of" any of the ingredients or steps disclosed throughout the specification. With respect to the transitional phase "consisting essentially of," in one non-limiting aspect, a basic and novel characteristic of the compositions and methods disclosed in this specification includes a method for injection overmolding a 3D-printed functional wafer onto a base lens whereby the cavity temperature is raised to a temperature that is at least 10° C. below the wafer glass transition temperature.

Other objects, features and advantages of the present invention will become apparent from the following detailed description. It should be understood, however, that the detailed description and the examples, while indicating specific embodiments of the invention, are given by way of illustration only. Additionally, it is contemplated that changes and modifications within the spirit and scope of the invention will become apparent to those skilled in the art from this detailed description.

DETAILED DESCRIPTION

Figure 1:
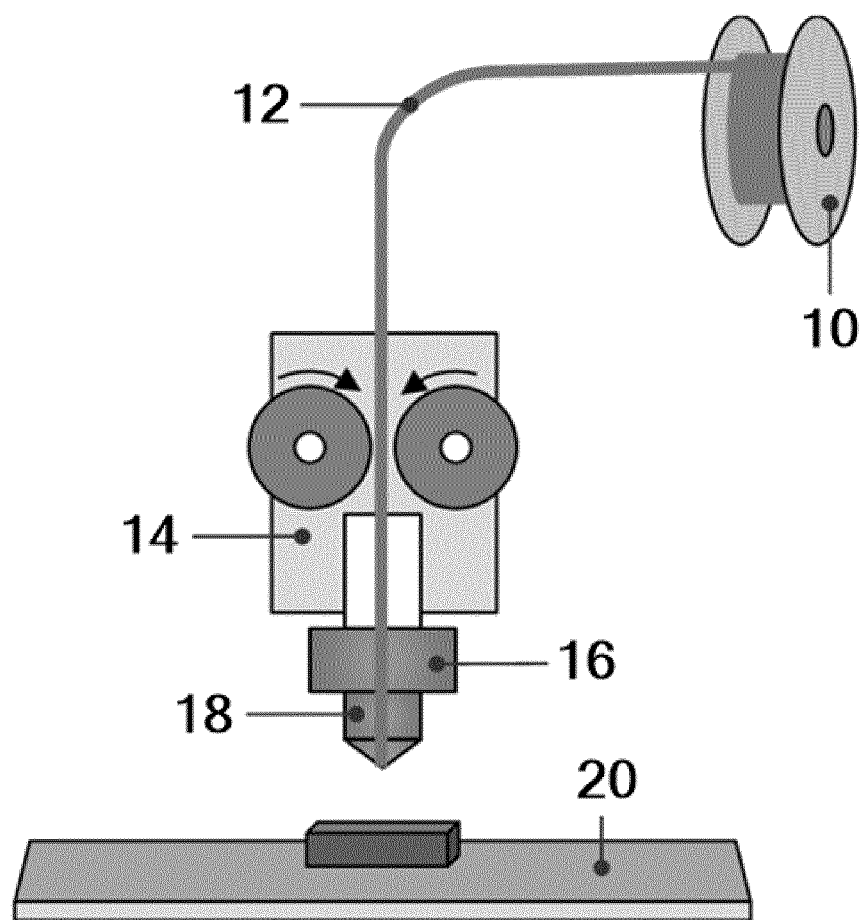
FIG. 1 is a schematic of an FDM 3D printing apparatus.

Various features and advantageous details are explained more fully with reference to the non-limiting embodiments that are illustrated in the accompanying drawings and detailed in the following description. It should be understood, however, that the detailed description and the specific examples, while indicating embodiments, are given by way of illustration only, and not by way of limitation. Various substitutions, modifications, additions, and/or rearrangements will be apparent to those of ordinary skill in the art from this disclosure.

In the following description, numerous specific details are provided to provide a thorough understanding of the disclosed embodiments. One of ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

A wafer is defined as a structure that possesses particular desired optical attributes, e.g., selective light transmittance, reflectance or absorbance, polarization properties, color, photochromism, electrochromism, and the like. The wafer structure is produced by an additive manufacturing process. The process involves deposition of multiple filament voxels adhered, or otherwise secured, to each other. An optically smooth surface refers to a transparent object surface that has a roughness of less than 20 nm RMS, preferably less than 17 nm RMS. Non-optical quality refers to a transparent object having a surface roughness that is greater than 50 nm RMS.

As used herein, "inter-diffuse" and derivatives, means movement of at least an ion, molecule, portion of a molecule, or portion of a polymer chain, from the space occupied by one voxel into the space occupied by a juxtaposed, physically contacting, voxel. Inter-diffusion can occur spontaneously or be induced by mechanical, physical, or chemical treatment. For example, a mechanical treatment includes agitation, such as by exposure to ultra-sonic energy, high-frequency vibratory device, etc., which promote mixing at the voxel boundaries. Macro-diffusion is a mechanical method wherein the voxels are blended or "smeared" by table vibrations, especially where such vibrations occur at the time of deposition, resulting in intimate voxel-to-voxel contact. An exemplary physical treatment includes a thermal treatment by exposure to heat, infrared, microwave, etc., radiation. A thermal treatment increases temperature above the glass-liquid transition point (Tg) of the high viscosity domain in the voxels and promotes inter-diffusion. An exemplary chemical treatment includes a chemical reaction between reactive species of composition. The molecular mass of the polymers present in the voxels can be reduced, such as by two-pathway chemistries or reversible reactions, to promote inter-diffusion.

As used herein, "voxel" means a volume element. A voxel is a distinguishable, geometric shape which is part of a three-dimensional space. The diameter, width, or thickness of a voxel is typically in the range of 0.1 to 500 µm. A voxel includes elongated shapes, such as strands, therefore, the length of a voxel does not necessarily include an upper limit. A voxel length can be 0.1 µm, 100 µm, 0.1 cm, 100 cm, greater than 100 cm, or any length therebetween. "Voxel" can refer to an individual element which, in combination with other voxels, can define a line or a layer or other predetermined shape or pattern within the three-dimensional space. Constituted voxels can be any desired shape, depending on the technology and manufacturing process conditions used. A plurality or collection of adjacent voxels, when arranged, can create or define a line or layer and can constitute an optical element. A particular voxel may be identified by x, y, and z coordinates of a selected point of geometry of the shape, such as a corner, center, or by other means known in the art. The boundary of a voxel is defined by the outer surface of the voxel. Such boundaries may be in close proximity to, with or without contacting.

As used herein, "Additive Manufacturing" means manufacturing technology as defined in the international standard ASTM 2792-12, describing a process of joining materials to make 3-D solid objects from a 3-D digital model. The process is referred to as "3-D printing" or "materials printing" since successive layers are laid down atop one another. Printing materials include liquids, powders, filaments, and sheet materials, from which series of cross-sectional layers are built. The layers, which correspond to the virtual cross sections from the CAD (Computer Aided Design) model, are joined or automatically fused to create the solid 3-D object. Additive Manufacturing includes, but is not limited to, manufacturing methods such as stereolithography, mask stereolithography, mask projection stereolithography, polymer jetting, scanning laser sintering (SLS), scanning laser melting (SLM), and fused deposition modelling (FDM). Additive Manufacturing technologies comprise processes which create 3-D solid objects by juxtaposition of volume elements or particles according to a pre-determined arrangement, typically defined in a CAD file. Juxtaposition is understood as sequential operations including building one material layer on top of a previously built material layer, and/or positioning a material volume element next to a previously deposited material volume element. The term "part" refers to any part built using a layer-based additive manufacturing technique, and includes 3D parts and support structures built using layer-based additive manufacturing techniques. An exemplary part disclosed herein is a functional wafer.

The term "polymer" refers to a polymeric material having one or more monomer species, including homopolymers, copolymers, terpolymers, and the like. As used herein, "thermoplastic" is understood to be a polymer resin that can melt when exposed to heat, and preferably is optically clear and of optical grade.

Fused deposition modeling is the most widely used 3D printing technology for producing thermoplastic parts. An FDM 3D printer (FIG. 1) builds parts by extruding a thermoplastic filament through a heated nozzle. Generally, the filament 12 is fed to extruder 14, which includes heater block 16 and heated nozzle 18. The melted filament is delivered through the heated nozzle 18 onto a printing bed 20. The melted filament is applied on the X-Y plane to produce the first layer. Once first layer is complete, the platform is lowered along the Z-axis direction and a second layer is then printed. The above steps are repeated till the part is manufactured. The hot strands weld to one another to form a solid part.

FDM is one of the most cost-effective methods for producing custom thermoplastic parts and prototypes. One major disadvantage of FDM 3D printing is its inability to deposit filament at a resolution that is high enough to achieve optical quality. The layering method of FDM results in rough edges on the surface of the 3D-printed part that scatter light and lead to a non-transparent appearance.

Because 3D printing is more cost-effective for small volumes and quick prototyping tasks, FDM can be used to produce functional wafers from a thermoplastic filament having specific dyes and/or filters. Examples include UV cut, blue cut, NIR cut, color enhancement, chronocut, and photochromic filters. The resulting functional wafer can then be integrated onto the front surface of an ophthalmic lens by injection over-molding process (or film insert molding process).

Conventional injection over-molding process were examined, however, these failed to produce lenses of optical quality, despite the high heat and pressure provided by the injection molding apparatus. In the conventional injection over-molding process, the entire injection over-molding cycle takes place at a constant cavity temperature ($T_{cavity}$) that is substantially lower than the glass transition temperature of the wafer material ($T_{g,\ wafer}$). The glass transition temperature characterizes a second order transition of amorphous polymers from brittle, glassy solids to viscous or rubber-like substances. $T_{cavity}$ must be lower than $T_{g,\ wafer}$ so that the functional wafer holds its shape when being inserted into the cavity. Further, $T_{cavity}$ must be lower than the glass transition temperature of the lens material ($T_{g,\ lens}$) so the resulting lens is in a solid form that is rigid enough to be ejected without deformation. Most commonly, $T_{cavity} \leq T_{g,\ lens} - 20°$ C. The wafer and the lens are typically made of the same material in order to provide compatibility between the wafer and the lens for good bonding. In this case, $T_{g, wafer} = T_{g, lens}$.

Figure 2:
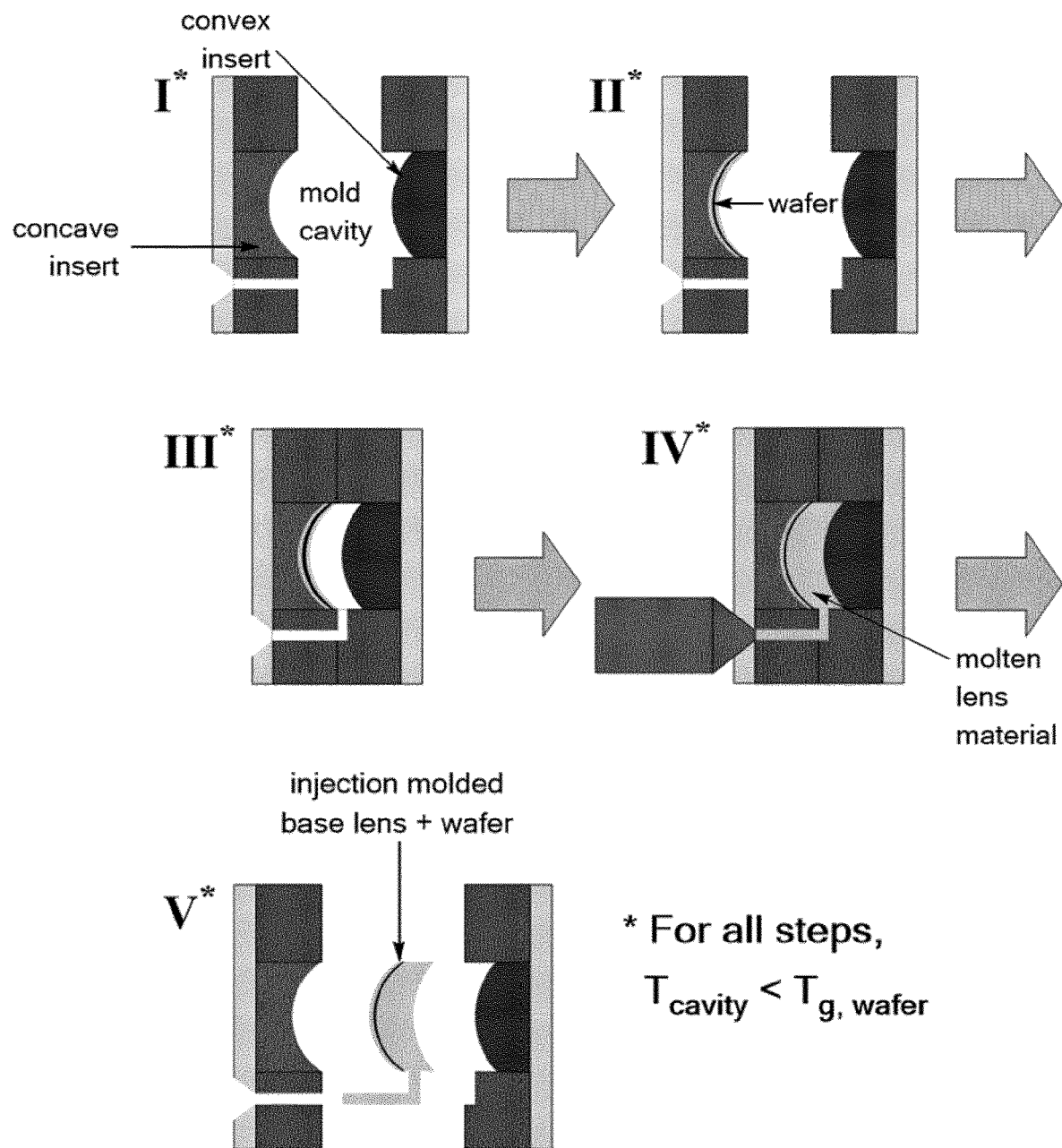
FIG. 2 is a schematic that depicts a conventional injection over-molding method in which the cavity temperature is maintained below the wafer glass transition temperature.

The diagram in FIG. 2 represents a conventional injection over-molding process. The injection molding apparatus consists of two mold halves and two opposite facing inserts. The concave and convex insert each reside in a mold half, forming a cavity. In a conventional injection molding process, the cavity temperature $T_{cavity}$ is maintained at a constant temperature. In step I, the mold is opened to provide access to the insert surfaces. In step II, a functional wafer is inserted. The wafer is affixed to the concave insert surface. In step III, the two mold halves are joined to close the mold and form the injection molding cavity. The cavity space is a template that represents the shape of the lens to be molded. In step IV, molten lens material is injected into the mold cavity, and the molten lens material becomes fuse-bonded to the wafer. In step V, the mold halves are separated and the lens is ejected.

Figure 3:
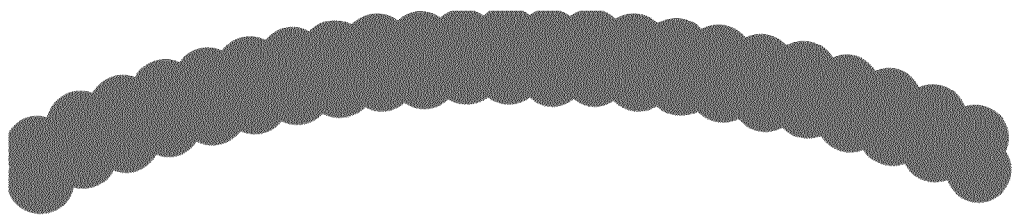
FIG. 3 is an illustration that represents an FDM 3D-printed functional wafer. The wafer has rough surfaces that inherently results from the FDM 3D-printing process.

One reason conventional injection over-molding processes are not able to produce lenses of optical quality using 3D-printed functional wafers is because the convex surface of the wafer is kept at a temperature well below its $T_g$. The convex surface remains solid throughout the injection over-molding process and retains the surface ridges resulting from voxel deposition (FIG. 3). This problem can be overcome by increasing the cavity temperature to a temperature that is at least 10° C. below the wafer thermoplastic Tg ($T_{cavity} \geq T_{g.wafer} - 10°$ C.), preferably to a temperature that is at least 5° C. above the functional wafer glass transition temperature ($T_{cavity} \geq T_{g.wafer} + 5°$ C.). At these cavity temperature ranges, the wafer material is able to undergo viscoelastic deformation. The wafer material's convex surface undergoes viscoelastic deformation under the high heat and high injection pressure to replicate the surface of the concave insert. A lens manufactured according to the criteria set forth above has an optically smooth front surface, with the wafer's original surface roughness having been reduced.

Figure 4:
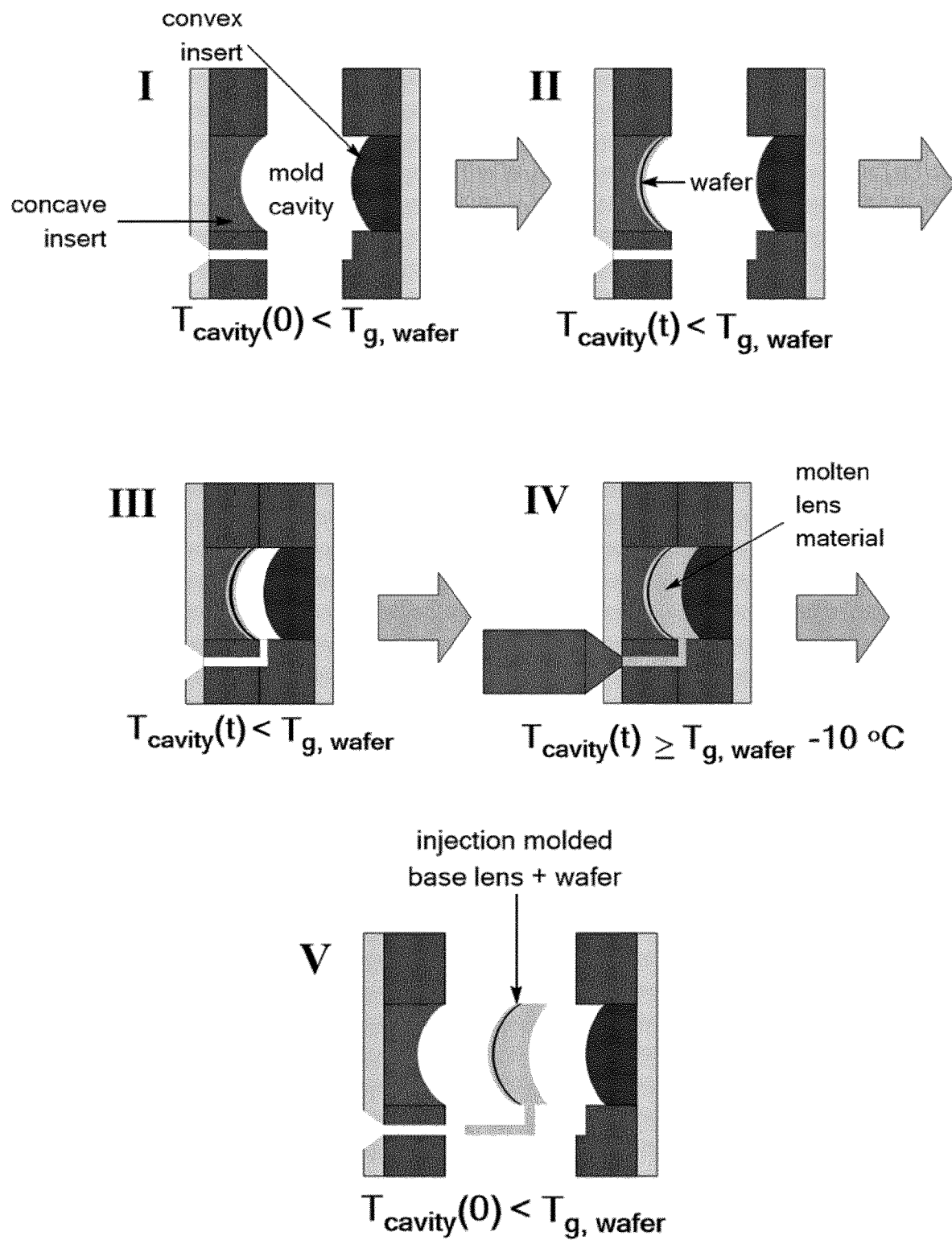
FIG. 4 is a schematic illustrating an injection over-molding process as disclosed herein. The process includes the step of raising the cavity temperature to at least 10° C. below the wafer glass transition temperature

The injection over-molding process disclosed herein employs a variable cavity temperature (FIG. 4). The process involves increasing the cavity temperature to a temperature that is at least 10° C. below the wafer thermoplastic Tg, preferably to a temperature that is at least 5° C. above the wafer thermoplastic Tg. At this temperature, the wafer material softens enough to undergo viscoelastic deformation under the high injection pressure to replicate the surface of the concave insert. This results in the production of a wafer-over-molded lens with an optically smooth front surface.

In the injection over-molding process disclosed herein, the process starts at Step I "Open mold" at time 0, at which the cavity temperature $T_{cavity}(0)$ is at a temperature substantially lower than $T_{g, wafer}$ and $T_{g, lens}$ ($T_{cavity}(0) < T_{g, wafer}$ and $T_{cavity}(0) < T_{g, lens}$). In some embodiments, $T_{cavity}(0)$ ranges from room temperature to 10° C. below the functional wafer glass transition temperature. Heating of the cavity including the 2 mold halves and inserts commences. In Step II, the functional wafer is inserted into the cavity abutting the concave insert. The cavity temperature at this time $T_{cavity}(t)$ is still substantially lower than $T_{g, wafer}$. Heating of the cavity continues and the 2 mold halves close to form the final cavity at Step III. In Step IV, injection of the molten lens materials begins while the cavity is being heated to a temperature that is 10° C. below the glass transition temperature of the wafer material ($T_{cavity}(t) \geq T_{g, wafer} - 10°$ C.). After the cavity is completely filled and packed under pressure, heating is discontinued and the temperature begins to drop back to $T_{cavity}(0)$. In Step V, the mold is opened to eject the solidified lens and the injection over-molding cycle is completed. At this time, the cavity temperature is holding at $T_{cavity}(0)$. In embodiments where dissimilar wafer and lens materials are used, $T_{cavity}(0)$ is lower than both $T_{g, lens}$ and $T_{g, wafer}$ to prevent deformation of the resulting lens.

EXAMPLES

Example 1

Base lens material 1—A UV-stabilized polycarbonate (Sabic Lexan® OQ3820) was employed as the base lens material. This PC resin has a glass transition temperature of 150° C. and a UV-cut at about 380 nm, as measured through a 2 mm thick lens.

Functional wafer 1—The same polycarbonate used in base lens material 1 was compounded with 1.0% of a UV absorber (Tinuvin® 326) and extruded into 1.75 mm filaments. A 4-base plano wafer, 76 mm in diameter and 1.0 mm in thickness, was FDM 3D-printed using the filaments. 3D-printed functional wafer 1 was non-transparent with a rough surface.

Functional wafer 1 was applied onto base lens material 1 employing the key parameters listed in Table 1 below.

TABLE 1

| | |
|---|---|
| Concave insert | Steel, 76 mm, and R132.5 mm |
| Convex insert | Steel, 76 mm, and R88.3 mm |
| Lens material | Base lens material 1 (PC) |
| Wafer material | Functional wafer 1 material (PC + UV absorber) |
| FDM printed wafer geometry | 4-base, 76 mm, R132.5 mm, thickness 1 mm |
| $T_{g, lens}$ | 150° C. |
| $T_{g, wafer}$ | 150° C. |
| Melt temperature ($T_{melt}$) | 260° C. |
| $T_{cavity}(0)$ at Step I | 120° C. |
| $T_{cavity}(t)$ at end of Step IV | 150° C. |

The resulting semi-finished (SF) lens, 10 mm in thickness, was optically transparent with a smooth front surface and exhibited a UV-cut at about 402 nm after surfacing to 2 mm plano. In addition, the blue cut performance BVC B' was determined to be about 30%.

Example 2

Base lens material 2—A PMMA resin (Evonik ACRY-LITE® hw55) was employed as base lens material 2.

Functional wafer 2—The same 3D-printed functional wafer as used in Example 1 above. Functional wafer 2 was applied to base lens material 2 using the key parameters listed in Table 2 below.

TABLE 2

| | |
|---|---|
| Concave insert | Steel, 76 mm, and R132.5 mm |
| Convex insert | Steel, 76 mm, and R88.3 mm |
| Lens material | Base lens material 2 (PMMA) |
| Wafer material | Functional wafer 1 material (PC + UV resin) |
| FDM printed wafer geometry | 4-base, 76 mm, R132.5 mm, thickness 1 mm |
| $T_{g, lens}$ | 120° C. |
| $T_{g, wafer}$ | 150° C. |
| Melt temperature ($T_{melt}$) | 245° C. |
| $T_{cavity}(0)$ at Step I | 100° C. |
| $T_{cavity}(t)$ at end of Step IV | 150° C. |

The resulting 10 mm thick SF lens was optically transparent with a smooth front surface and exhibited a UV-cut at about 402 nm after surfacing to 2 mm plano. The blue cut performance BVC B' was measured to be about 30%.

The claims are not to be interpreted as including means-plus- or step-plus-function limitations, unless such a limitation is explicitly recited in a given claim using the phrase(s) "means for" or "step for," respectively.

The invention claimed is:

1. A method for producing an optical article, the method comprising over-molding an additive manufactured functional wafer having a functional wafer glass transition temperature onto a convex surface of a base lens to produce an ophthalmic lens, wherein the over-molding comprises:
    affixing the functional wafer to a concave surface of an injection molding cavity;
    filling the injection molding cavity with molten base lens material; and
    raising the injection molding cavity temperature from a first temperature to a second temperature that is at least 10° C. less than the functional wafer glass transition temperature and up to and including 5° C. above the functional wafer glass transition temperature, such that $T_{g,wafer}+5°\,C. \geq T_{cavity} \geq T_{g,wafer}-10°\,C.$ 2. The method of claim 1, wherein the over-molding viscoelastically deforms the functional wafer.

3. The method of claim 2, wherein the viscoelastic deformation templates the texture of the concave surface of the mold cavity onto the convex surface of the functional wafer.

4. The method of claim 3, wherein a templating produces an ophthalmic lens with an optically smooth convex surface having a roughness less than 20 nm RMS.

5. The method of claim 1, wherein the additive manufactured functional wafer is a wafer of non-optical quality with a surface roughness greater than 50 nm RMS.

6. The method of claim 1, wherein the functional wafer includes at least one UV cut, blue cut, color enhancement, near infrared cut, chronocut, and/or photochromicity dye or filter.

7. The method of claim 1, wherein the functional wafer material is selected from the group consisting of polyamides, polyester alloys, polyethylenes, polysiloxanes, polyimides, polyurethanes, polypropylenes, polyetheretherketones, polyetherarylketones, perfluoroalkoxys, polychloro-trifluoroethylenes, poly(meth)acrylate, polyethyl(meth)acrylate, polybutyl(meth)acrylate, polyisobutyl(meth)acrylate, polythiourethanes, polycarbonates (PC), polyallylics, polyphenylene sulfides, polyvinyls, polyarylenes, polyoxides, polysulfones, fluorinated ethylene propylenes, polytetrafluoroethylenes, ethylene-tetrafluoroethylenes, polyvinylidene fluorides, ethylene-chlorortifluoroethylenes, polystyrenes, polyacrylonitriles, polyetherimides, polypentenes, cellulose triacetate, and copolymers, derivatives, and mixtures thereof.

8. The method of claim 1, wherein the first temperature ranges from room temperature to 10° C. below the functional wafer glass transition temperature.

* * * * *